UNITED STATES PATENT OFFICE.

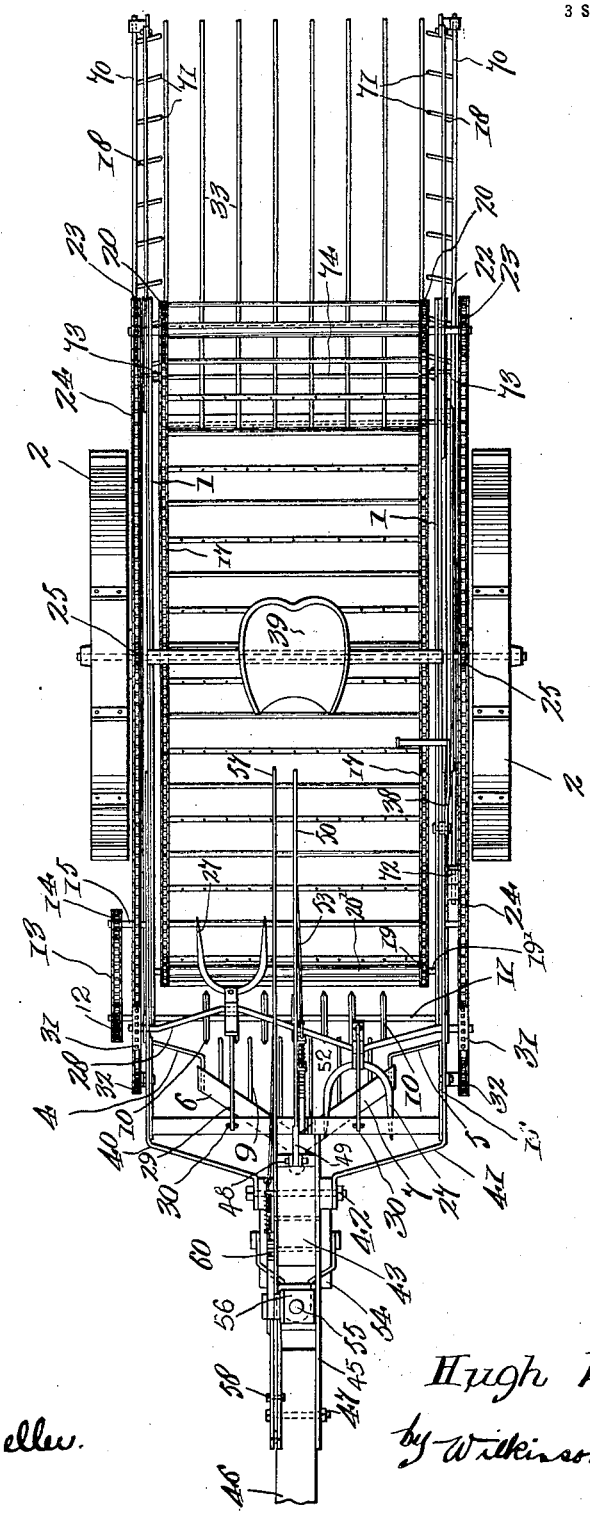

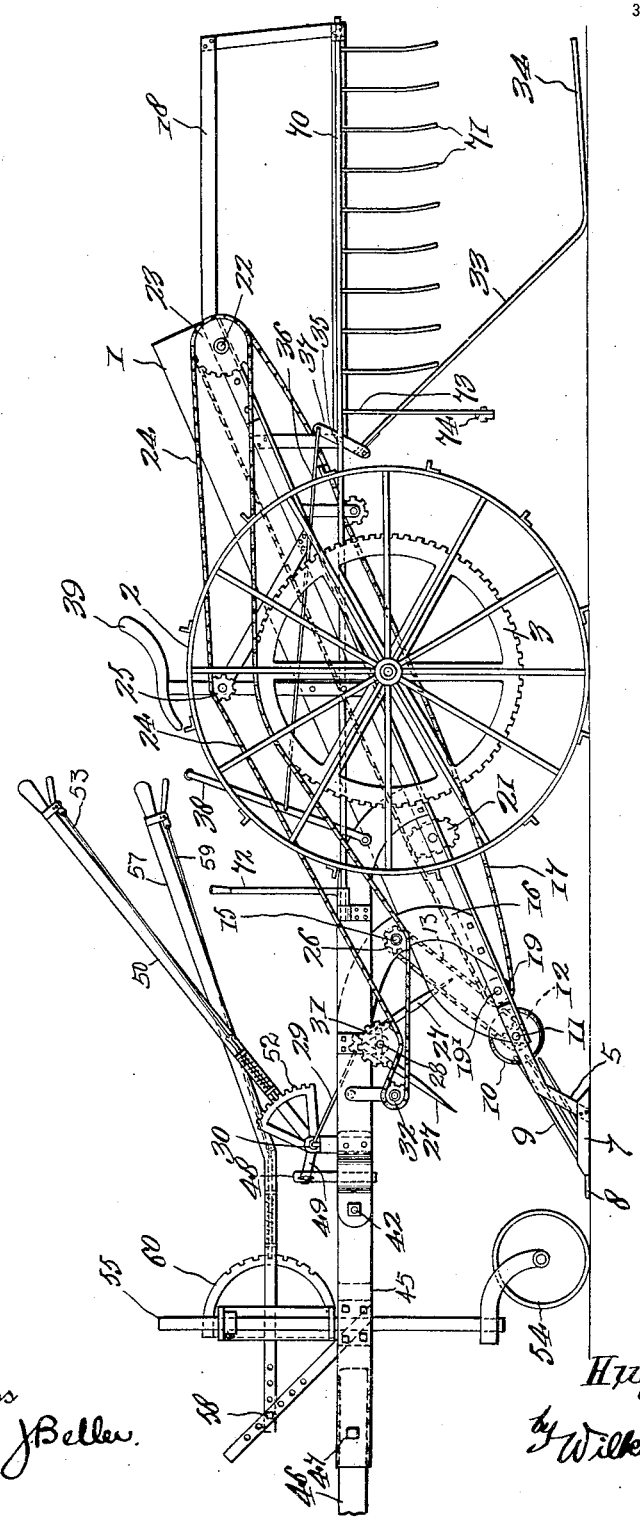

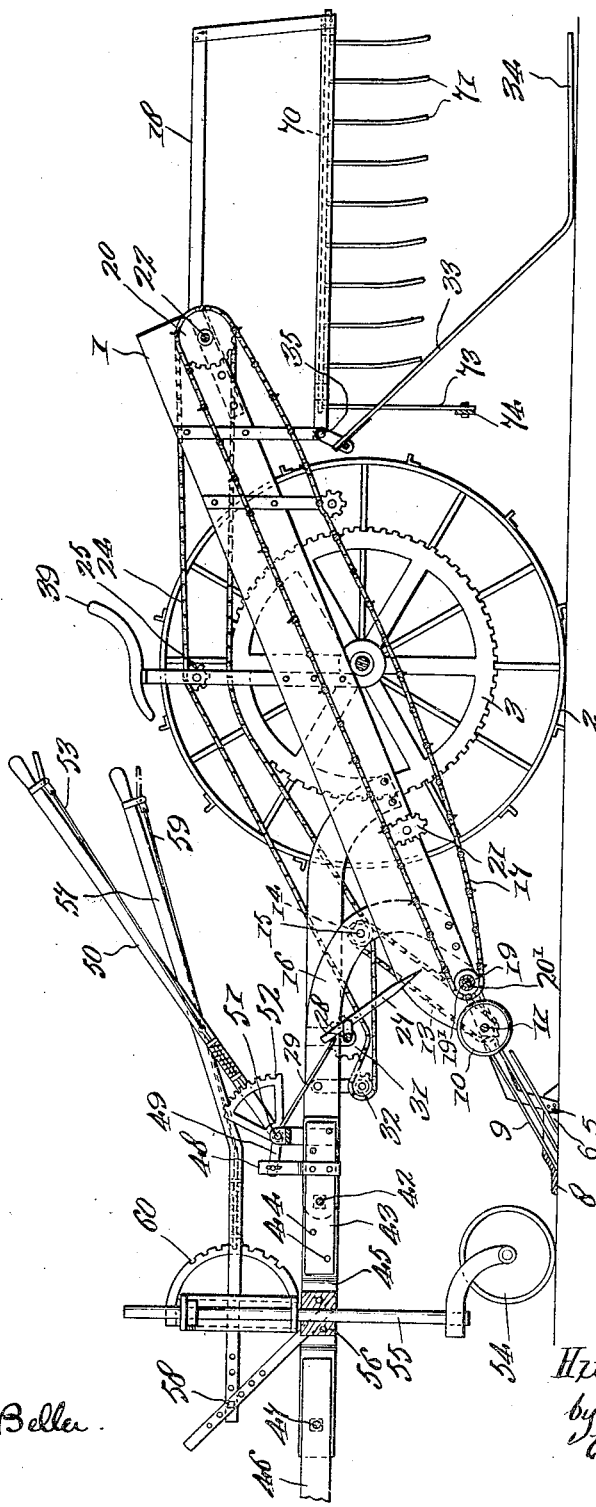

HUGH L. PERCIVALL, OF PETERSBURG, VIRGINIA.

PEANUT-HARVESTER.

1,321,326.　　　　　Specification of Letters Patent.　　Patented Nov. 11, 1919.

Application filed September 25, 1918. Serial No. 255,675.

*To all whom it may concern:*

Be it known that I, HUGH L. PERCIVALL, a citizen of the United States, residing at Petersburg, in the county of Dinwiddie and State of Virginia, have invented certain new and useful Improvements in Peanut-Harvesters; and I do hereby declare the following to be a full, clear, and exact description of the invention, such as will enable others skilled in the art to which it appertains to make and use the same.

The present invention relates to improvements in peanut harvesters, and has for an object an improved harvester that will be capable of operation upon both the Spanish or Bunch or the Virginia Runner variety of peanuts.

It is another object of the present invention to provide an improved peanut harvester in which the vines and peanuts are adapted to be conveyed to a receiver after tap root is first cut by the plow, which receiver is adapted to hold the accumulated vines with the peanuts on them until a suitable point has been arrived at where they are deposited in the windrows.

A further object of the present invention resides in providing for the separation of the earth and other foreign matter from the peanuts during their passage to the receiver after being severed from tap root by the plow.

A still further object of the present invention lies in providing improved means for severing the dirt from the peanuts and for providing for their transfer from the cutting mechanism to the conveying mechanism by which they are carried to the receiver.

It is also an object of my invention to provide a pivoted tongue on the machine by which the same may be drawn along, in combination with other parts by which the plow may be lowered to the required depth.

In the accompanying drawings forming a part of this application, and in which similar reference symbols indicate corresponding parts in the several views:

Figure 1 is a top plan view of an improved peanut harvester constructed in accordance with the present invention.

Fig. 2 is a side elevational view of the same; and

Fig. 3 is a vertical sectional view.

Referring more particularly to the drawings, 1 designates generally the framework of the machine, which may be of any suitable character, adapted to receive the various mechanisms; and this framework 1 is supported for motion on a pair of ground wheels 2 which carry gear wheels 3, by which motion may be transmitted to the various parts as hereinafter more fully described.

The framework 1 is provided with a pair of forwardly and downwardly extending bent arms 4 and 5 which are connected to and act as supports for side wings 6 and 7 of the plow, the plow point or share being indicated at 8 in Figs. 2 and 3. This plow is preferably of the shape shown in the drawings in which the wings 6 and 7 diverge rearwardly from the plow point 8 and are arranged on the inclination shown.

The plow, including the wings 6 and 7, supports a series of spaced rods 9 which are directed upwardly and rearwardly from the plow and have their free upper ends arranged between rotary disks 10 mounted on a shaft 11 also journaled in the framework 1.

These disks 10 coöperate with the plow to shake the dirt from the peanuts which are on the vines; and such disks also assist to break up the clods of earth clinging to them and to divide the masses of earth and vines in such a manner as to provide for the ready separation of same after they are once transferred onto the conveyer, as subsequently referred to.

A sprocket 12 is carried on the shaft 11 and is rotated by a chain 13 which is also in engagement with a sprocket 14 on a countershaft 15. The countershaft 15 is journaled in the side stock pieces 16 which assist to support the framework 1 forwardly of the ground wheels 2.

At 17 is shown the conveyer by which the peanuts are transferred from the plow to a receiver 18 arranged at the rear end of the framework 1, and adapted to hold the accumulated vines until such time as their release in a windrow is desired. This conveyer 17 is preferably made up of side chains which operate over pairs of upper sprockets 20 also journaled in appropriate parts of the framework, and the chains are connected by suitable conveyer cross members on which the vines are supported. The lower ends of the conveyer chain run over rollers 19 mounted to turn about a rod 19'. The rollers 19 are held separated by a sleeve 20' also adapted to turn on the rod 19' in order to prevent the winding of grass and the vines thereabout.

The conveyer is preferably of an openwork structure to admit of the passage of earth and other foreign matter therethrough, and to assist in the separation of such matter from the peanut vines the conveyer is preferably vibrated. This vibration is developed in the instance shown by a pinion 21 having an irregular driving edge provided with teeth that engage the sprocket chain 17. If desired, two of these eccentric pinions 21 may be provided, one in engagement with each of the conveyer chains. The movement of the conveyer chains will operate to drive the eccentric pinions 21, and the upper side of the conveyer will be accordingly vibrated.

The shaft 22 on which the upper sprockets 20 are mounted is extended beyond the sprockets 20 where it carries other sprockets 23 in engagement with chains by which the conveyer receives its motion. These chains are indicated at 24, and the lower branches thereof, as shown clearly in Figs. 2 and 3, rest upon the upper part of the gear wheels 3. Consequently when the machine is put in motion the gear wheels 3 will be rotated and will consequently impart movement to the drive chains 24. The upper branches of the chains 24 pass over idlers 25 and the chains also pass about small sprockets 26 which are on the same shafts 15 that carry the sprockets 14. In this manner the necessary rotation is communicated to the disks 10.

Knives 27, preferably mounted in pairs and carried on a crank shaft 28 journaled in suitable parts of the framework, are arranged above the disks 10 and the lower forward part of the conveyer, the knives being connected to rods 29 having a pivotal motion about fixed centers 30. The arrangement is such that when the crank shaft 28 is rotated the knives 27 will receive an oscillating motion. Four knives are shown in the drawings, they being offset relatively so that they will operate alternately, and in this way one of the knives is constantly in engagement with the vines so as to prevent the same slipping forwardly and down upon the plow.

The purpose of the knives 27 is to catch the cut vines as they are received from the plow and to thrust them upwardly onto the conveyer 17. The crank shaft 28 carries at its ends sprockets 31 which are also in mesh with the chains 24, and the chains thus also are employed to drive the knives. The forward end bight of the chains 24 pass about small sprockets 32. The conveyer 17 is arranged to deposit the vines into the receiver 18 at the rear of the machine, which receiver is provided with the drop bottom 33 having the upturned end 34.

This drop bottom is pivoted, as indicated at 35, at the forward end of the receiver, and is normally in the raised position in which the bottom 33 extends substantially horizontally beneath the receiver. In both Figs. 2 and 3 the bottom is shown in the lowered position, where it is allowed to drop in order to release the vines and allow them to take their position in the windrow which is being formed.

A link 36 connects the upper end of a stub arm 37, by which the bottom 33 is carried, to a foot lever 38 at the forward part of the framework, which latter is arranged in a position to be depressed by the operator's foot and held down until such time as the bottom 33 is to be permitted to drop. The operator's seat is indicated at 39 just rearwardly of the foot lever 38.

The beams 40 and 41 which extend from the forward part of the framework, are bent in substantially the manner shown in Fig. 1, and have their forward ends pivoted as indicated at 42 to a bar 43, the ends of which project to both sides of the pivot point. The forward part of this bar 43 is bolted or otherwise secured, as indicated at 44, to side plates 45 which extend in advance of the bar 43 and receive between the forward ends thereof the rear end of the tongue 46 by which the vehicle is to be drawn along. This tongue is mounted on a horizontal pivot 47 carried by the forward ends of the plates 45 and the tongue is thus permitted to have a free vertically swinging motion.

The rear end of the bar 43 carries a post 48 connected to the short arm 49 of a lever 50 which is pivoted as indicated at 51. The segment 52 is adapted to coöperate with the latch 53 carried by the lever 50 for locking the lever in the adjusted position. The lever 50 is also arranged convenient to the driver's hand as he sits in the seat 39, and by means of this lever the bar 43 may be rocked about the pivot 42 and held in the adjusted position.

At 54 there is shown a gage wheel carried on a stem 55 which passes up through a block 56 carried by the plates 45, the block being arranged between the tongue 46 and the bar 43. A lever 57 is arranged to raise and lower the stem 55 of the gage wheel, such lever being pivoted at 58 with adjustable parts to vary the fulcrum, if desired. This lever 57 also carries a latch device 59 coöperating with the notched segment 60, whereby the lever may be held in the adjusted position.

The operation of the invention is substantially as follows:

Horses or other draft power is supplied to the tongue 46 and the machine is drawn along over the field. By the operation of the lever 57 the gage wheel 54 is moved to any desired vertical position, and such gage wheel controls the depth to which the plow 8 may be lowered. This plow 8 is thrown into and out of contact with the soil by means of the lever 50, which, if lowered, will raise the rear part of the bar 43 and cause the gage wheel, which is connected to the forward part of such bar 43, to be lowered, and in this manner causes the plow 8 to be elevated.

As the machine is drawn along, the ground wheels 2 being of course rotated and the gear wheels 3 which they carry consequently rotating, the necessary motion will be imparted to the chains 24 to cause the latter to drive the several mechanisms already described. The driver will constantly hold the foot lever 38 depressed so that the bottom 33 may be held elevated beneath the receiver 18. The plow having been lowered to the required depth for cutting the variety of tap root operated upon, the same will act to sever such root and to cause the cut vines with the peanuts thereon to pass up over the spaced rods 9 which permit the earth to fall therebetween and separate, in a measure, from said vines.

The separation is further assisted by the rotary disks 10, and separation is also carried on by means of the reciprocating knives 27 and the vibrating conveyer 17. The vines are carried by the vibrating conveyer to the receiver 18, where they are allowed to accumulate until the windrow is reached, when the operator releases the foot lever 38 and permits the bottom 33 to drop to the position shown in Figs. 2 and 3. After release the foot lever is again returned to the depressed position, so that the receiver may acquire a subsequent load.

Horizontal rods 70, capable of rotating, are mounted at the rear of the machine at each side of the drop bottom 33. Fingers 71 depend from the rods 70 and may be made to assume any desired angular position by turning the rods 70. One rod 70 is extended forward of the seat 39 where same is provided with an arm 72 by which it may be turned. The two rods 70 are connected together for operation together from this arm 72. Cranks 73 on the rods provide for the connection of a link 74. The connection may, of course, be through other mechanical parts. By shifting the rods and fingers in the one or the other direction, the accumulated vines and peanuts in the receiver may be diverted to either side of the machine when the bottom is dropped. In this way the windrow may be formed out of the path of the adjacent ground wheel on the return of the machine.

It is obvious that those skilled in the art may vary the details of construction and arrangements of parts without departing from the spirit of my invention, and therefore I do not wish to be limited to such features except as may be required by the claims.

I claim:

1. In a peanut harvester, a wheeled frame, a cutting implement thereon, spaced rods extending upwardly and rearwardly from said implement, disks between the free ends of said rods, means for rotating said disks, a conveyer adapted to receive the peanuts from said rods and disks, and oscillating knives above said rods and disks for assisting the latter to pass the peanuts on to said conveyer, substantially as described.

2. In a peanut harvester, a plow, a series of spaced rods on the plow, said rods extending at an inclination rearwardly, a conveyer having its receiving end spaced from the free ends of said rods, rotatable disks arranged in the space between said rods and conveyer, the free ends of said rods projecting between said disks, means for carrying and rotating said disks, and oscillating knives arranged above the rods and disks for assisting to transfer the peanuts from the rods to said conveyer, with means to actuate said knives, substantially as described.

3. In a peanut harvester, a plow having laterally-projecting inclined wings, rods on said plow and wings extending rearwardly and upwardly therefrom, a conveyer having its receiving end arranged near but slightly spaced from the rear free ends of said rods, a shaft passing transversely across the space between said conveyer and rods, spaced disks fixed on said shaft, the disks projecting beyond the conveyer and rods whereby to actively encounter the peanuts and agglomerated matter, means for rotating said shaft and disks, and movable knives above said disks and rods to assist in transferring the material from the latter onto the conveyer, substantially as described.

4. In a peanut harvester, a wheeled frame, a plow carried thereby and having lateral rearwardly diverging side wings, a number of thin short rods carried by the plow and its wings, said rods being arranged at an inclination, a conveyer arranged on substantially the same inclination and in substantially the same plane with said rods but separated from the free ends of the rods, a shaft passing transversely across the frame in the space between said conveyer and rods, disks on said shaft, oscillating knives carried above said disks and rods, and a common means whereby said shaft and disks, conveyer and knives are actuated, substantially as described.

In testimony whereof I affix my signature.

HUGH L. PERCIVALL.